US012523093B2

(12) United States Patent
Zhang

(10) Patent No.: US 12,523,093 B2
(45) Date of Patent: Jan. 13, 2026

(54) SLIDABLY EXTENDABLE BARRIER

(71) Applicant: Shengjun Zhang, Gonghe County (CN)

(72) Inventor: Shengjun Zhang, Gonghe County (CN)

( * ) Notice: Subject to any disclaimer, the term of this patent is extended or adjusted under 35 U.S.C. 154(b) by 0 days.

(21) Appl. No.: 19/248,516

(22) Filed: Jun. 25, 2025

(65) Prior Publication Data

US 2025/0320773 A1 Oct. 16, 2025

(30) Foreign Application Priority Data

Jun. 12, 2025 (CN) ......................... 202521205457.6

(51) Int. Cl.
*E06B 9/04* (2006.01)
*E06B 7/32* (2006.01)
*E06B 9/02* (2006.01)
*E06B 9/00* (2006.01)

(52) U.S. Cl.
CPC .................. *E06B 9/04* (2013.01); *E06B 7/32* (2013.01); *E06B 9/02* (2013.01); *E06B 2009/002* (2013.01)

(58) Field of Classification Search
CPC ..... E06B 9/02; E06B 9/04; E06B 9/06; E06B 2009/002; E06B 7/32
See application file for complete search history.

(56) References Cited

U.S. PATENT DOCUMENTS 5,070,647 A * 12/1991 Spialter ..................... E06B 9/02 49/141
5,528,859 A * 6/1996 Taylor ....................... E06B 9/02 49/55
8,261,490 B2 * 9/2012 Flannery ............. E05B 65/0007 49/55
8,418,407 B2 * 4/2013 Wang .................... E06B 9/0623 49/55
8,561,349 B2 * 10/2013 Flannery ............. F16B 37/0807 49/55
9,127,496 B1 * 9/2015 Flannery ................... E06B 9/06
9,567,798 B1 * 2/2017 Flannery ................... E06B 9/02
9,945,176 B2 * 4/2018 Flannery ............... E06B 9/0607
10,161,181 B1 * 12/2018 Flannery ............... E06B 11/021
11,459,817 B1 * 10/2022 Flannery ................... E06B 9/02
11,828,105 B1 * 11/2023 Flannery ................... E06B 9/06
(Continued)

*Primary Examiner* — Justin B Rephann

(57) ABSTRACT

The present invention discloses a slidably extendable barrier configured to be disposed between two opposing positions, including: a first sliding panel, a second sliding panel, a locking assembly and a pressure adjustment assembly. The first sliding panel and the second sliding panel are slidable relative to each other along the length direction; The locking assembly configured to selectively lock the first sliding panel and the second sliding panel in the length direction; The pressure adjustment assembly enables the slidably extendable barrier to be fixed between the two opposing positions. Through the described structural configuration, the barrier operates in a sequence of "sliding adjustment—locking positioning—pressure application", thereby achieving core advantages of "flexible adaptability, rapid installation, and stable reliability". It is particularly suitable for application scenarios requiring installation convenience, environmental compatibility (non-damaging), and situational adaptability, combining functional efficiency with practical utility.

16 Claims, 10 Drawing Sheets

(56) References Cited

U.S. PATENT DOCUMENTS

| | | | | |
|---|---|---|---|---|
| 2004/0238806 | A1 * | 12/2004 | Hicks | E06B 9/04 256/19 |
| 2008/0202047 | A1 * | 8/2008 | Flannery | E06B 9/04 49/505 |
| 2010/0083577 | A1 * | 4/2010 | Flannery | E06B 9/0615 49/130 |
| 2012/0324796 | A1 * | 12/2012 | Wang | E06B 9/0676 49/458 |

* cited by examiner

SLIDABLY EXTENDABLE BARRIER

CROSS-REFERENCE TO RELATED APPLICATIONS

The application claims priority of Chinese patent application CN2025212054576, filed on Jun. 12, 2025, which is incorporated herein by reference in its entireties.

TECHNICAL FIELD

The present disclosure relates to the field of space partitioning devices, and in particular, to a slidably extendable barrier configured to be adjustably mounted between two opposing fixed positions (such as walls, columns, door frames) for space separation and fixation.

BACKGROUND OF THE INVENTION

In the prior art, conventional barrier devices for separating opposing positions exhibit persistent limitations in both adjustability and fixation stability. Existing designs typically employ either rigid fixed-size structures or elementary sliding mechanisms, thereby lacking the capacity for adaptive expansion or precise positioning to accommodate diverse dimensional requirements. This deficiency becomes particularly evident when installing barriers in passages of different widths, where current solutions require complex assembly steps or additional accessories, thereby substantially reducing operational efficiency. Equally problematic, the over-simplified locking and pressure mechanisms in prevalent barrier systems are susceptible to gradual loosening during use, undermining both structural stability and safety. These well-recognized limitations in the art necessitate an improved barrier solution capable of seamless length adjustment coupled with positively secured positioning through interconnected locking and pressure-regulating components.

Additionally, substantially all conventional barrier devices employ a four-point support mounting system, requiring precise positioning of four support points between opposing surfaces for stable installation. In contrast, the slidably extendable barrier of the present disclosure achieves secure fixation between two opposing positions through an improved three-point support configuration, while maintaining equivalent structural stability, thereby significantly simplifying the mounting process.

Therefore, the present disclosure provides a slidably extendable barrier, which effectively addresses the aforementioned issues.

SUMMARY OF THE INVENTION

In order to overcome the shortcomings of the prior art, the present disclosure provides a slidably extendable barrier. The barrier features a simple structure that allows flexible sliding extension along its length direction, while achieving secure fixation through reliable locking and pressure-applying assemblies. Notably, it only requires three support points between two opposing positions for stable fixation, thereby significantly improving user experience.

The technical solution adopted by the present invention to solve the technical problem is as follows.

A slidably extendable barrier configured to be disposed between two opposing positions, including:

a first sliding panel includes a first frame, the first sliding panel extends along a length direction and a height direction;

a second sliding panel includes a second frame, the second sliding panel extends along the length direction and the height direction, and the first sliding panel and the second sliding panel are slidable relative to each other along the length direction;

a locking assembly configured to selectively lock the first sliding panel and the second sliding panel in the length direction; and a pressure adjustment assembly, when the locking assembly locks the first sliding panel and the second sliding panel in the length direction, the pressure adjustment assembly applies pressure to the first sliding panel and the second sliding panel, thereby gradually applying pressure on the two opposing positions, whereby the slidably extendable barrier is fixed between the two opposing positions.

As an improvement of the present invention, the slidably extendable barrier further includes a fixed pressure end unit, the first frame includes a first outer end member and a first inner end member; the second frame includes a second outer end member and a second inner end member; the pressure adjustment assembly includes a mounting base and a sliding pressure end unit; the mounting base is fixedly connected to the first outer end member; the fixed pressure end unit is fixedly connected to the second outer end member; and when the locking assembly locks the first sliding panel and the second sliding panel at a desired position along the length direction, the pressure adjustment assembly applies pressure to the first sliding panel and the second sliding panel, thereby enabling the sliding pressure end unit and the fixed pressure end unit to gradually apply pressure to the two opposing positions, whereby the slidably extendable barrier is fixed between the two opposing positions.

As an improvement of the present invention, the fixed pressure end unit includes a mounting surface in face-contact with the second outer end member, and an abutment surface configured to abut against one of the two opposing positions.

As an improvement of the present invention, the pressure adjustment assembly further includes an adjustment handle; the mounting base includes an adjustment screw; the adjustment handle is provided with a first internal thread; the adjustment screw is provided with a first external thread matching the first internal thread; and the adjustment handle and the adjustment screw are threadedly engaged.

As an improvement of the present invention, the adjustment screw includes an adjustment through-hole; the sliding pressure end unit includes a screw portion and an abutment end portion; the screw portion is provided with a second external thread, and a maximum outer diameter of the screw portion is smaller than an inner diameter of the adjustment through-hole, whereby the screw portion is slidable within the adjustment through-hole.

As an improvement of the present invention, the pressure adjustment assembly further includes a stop nut, and a maximum outer diameter of the stop nut is larger than the inner diameter of the adjustment through-hole; the stop nut is provided with a second internal thread matching the second external thread; the screw portion of the sliding pressure end unit is configured to pass through the adjustment through-hole and then threadedly engage with the stop nut, whereby the screw portion is partially retained within the adjustment through-hole during sliding movement of the sliding pressure end unit.

As an improvement of the present invention, the pressure adjustment assembly further includes an auxiliary adjustment nut; the auxiliary adjustment nut is provided with a third internal thread matching the second external thread; the screw portion of the sliding pressure end unit is configured to pass through the auxiliary adjustment nut and the adjustment through-hole in sequence, and finally threadedly engage with the stop nut.

As an improvement of the present invention, the first outer end member is provided with an accommodation through-hole; a position of the accommodation through-hole corresponds to a position of the adjustment through-hole; and an inner diameter of the accommodation through-hole is larger than the maximum outer diameter of the stop nut, whereby an end of the screw portion connected to the stop nut is slidable within the accommodation through-hole.

As an improvement of the present invention, the slidably extendable barrier further includes an elongated member fixedly connected to either the first frame or the second frame, the elongated member includes a plurality of spaced-apart preset positions; and the locking assembly is selectively engageable with any one of the preset positions to lock the first sliding panel and the second sliding panel.

As an improvement of the present invention, the locking assembly includes a locking rod; the locking rod includes a locking end and a control end; each preset position is provided with a locking hole; and when the locking end is aligned with the locking hole, pressing the control end to lock the first sliding panel and the second sliding panel, whereby relative sliding movement between the first sliding panel and the second sliding panel along the length direction is prevented.

As an improvement of the present invention, the locking assembly further includes a control button, and the control button is configured to disengage the first sliding panel and the second sliding panel from a locked state, whereby relative sliding movement between the first sliding panel and the second sliding panel along the length direction is enabled.

As an improvement of the present invention, a width direction is defined between the first frame and the second frame; the first frame and the second frame are meshed with each other along the width direction while remaining spaced-apart; the first frame and the second frame remain parallel to each other and slide parallelly along the length direction.

As an improvement of the present invention, the slidably extendable barrier further includes a sliding guide assembly fixedly mounted to the first frame and the second frame to maintain stability of the first frame and the second frame during sliding movement.

As an improvement of the present invention, the sliding guide assembly includes a plurality of guide elements; each guide element includes a fixed mounting portion and a sliding mounting portion; the first frame includes a first upper member and a first lower member; the second frame includes a second upper member and a second lower member; the fixed mounting portions of the plurality of guide elements are fixedly connected to the first upper member, the first lower member, the second upper member, and the second lower member, respectively; and the sliding mounting portions of the plurality of guide elements are slidably connected to the first upper member, the first lower member, the second upper member, and the second lower member, respectively.

As an improvement of the present invention, the first upper member, the first lower member, the second upper member and the second lower member are each simultaneously and fixedly connected to at least one of the fixed mounting portions and slidably connected to at least one of the sliding mounting portions.

As an improvement of the present invention, the abutment surface is provided with an anti-slip structure.

As an improvement of the present invention, the fixed pressure end unit includes a first pressure end component and a second pressure end component distributed along a height direction of the second outer end member.

As an improvement of the present invention, the abutment end portion is sleeved with a soft rubber layer.

As an improvement of the present invention, the first sliding panel further includes a first barrier component fixedly connected to an interior of the first frame; the second sliding panel further includes a second barrier component fixedly connected to an interior of the second frame; the first barrier component is configured to reduce a blocking gap in the first sliding panel; and the second barrier component is configured to reduce a blocking gap in the second sliding panel.

As an improvement of the present invention, the first barrier component includes rod-shaped elements or mesh-shaped elements uniformly arranged within the first frame; and the second barrier component includes rod-shaped elements or mesh-shaped elements uniformly arranged within the second frame.

The beneficial effects of the present disclosure are as follows: Through the described structural configuration, the barrier operates in a sequence of “sliding adjustment—locking positioning—pressure application”, thereby achieving core advantages of “flexible adaptability, rapid installation, and stable reliability”. It is particularly suitable for application scenarios requiring installation convenience, environmental compatibility (non-damaging), and situational adaptability, combining functional efficiency with practical utility.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
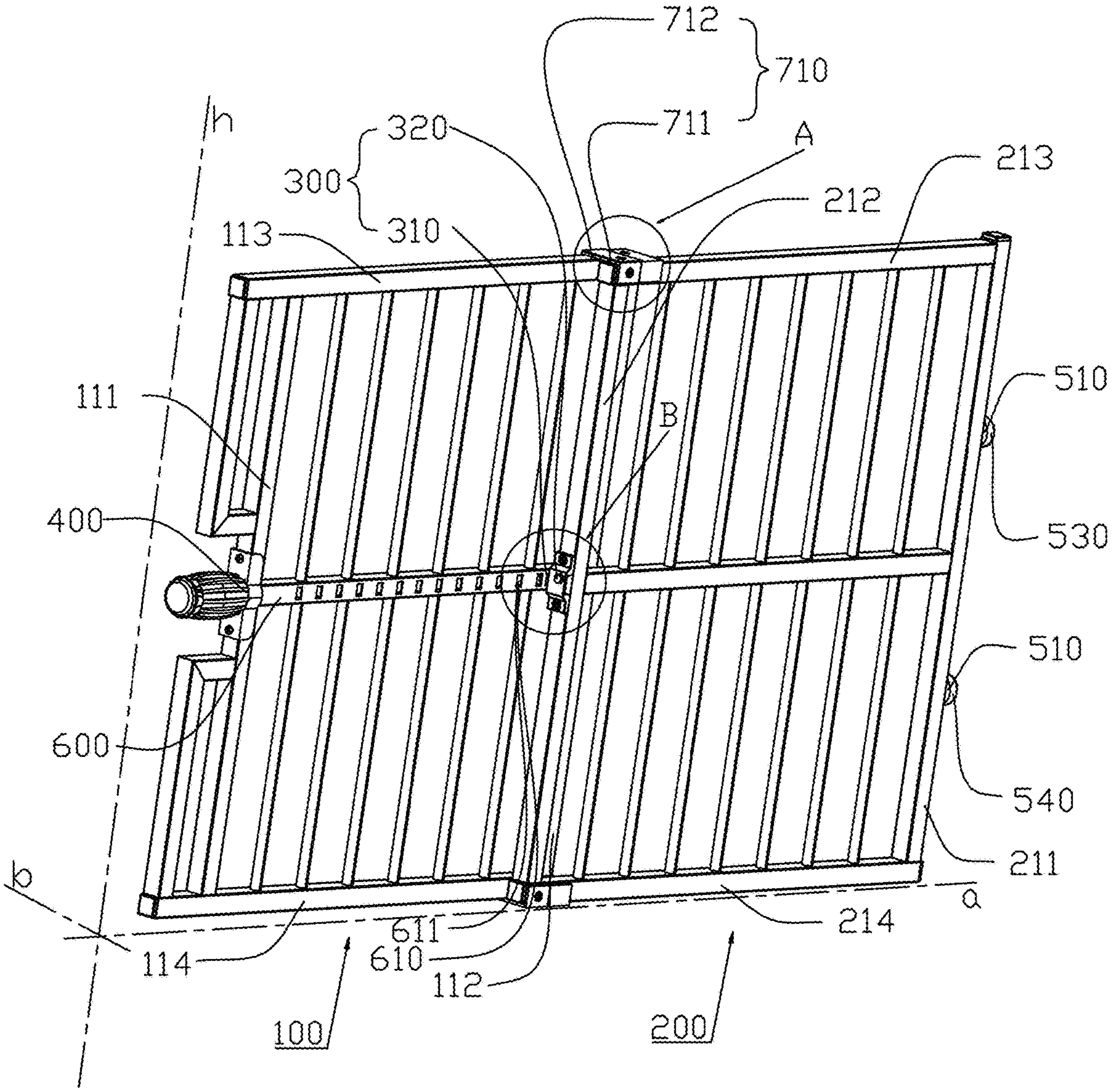
FIG. 1 is a first-angle overall view of a slidably extendable barrier according to the present disclosure.

To make the aforementioned objectives, features, and advantages of the present disclosure more comprehensible, specific implementations of the present disclosure are described in detail below in conjunction with the accompanying drawings. In the following description, numerous specific details are set forth to provide a thorough understanding of the present disclosure. The present disclosure may, however, be embodied in many forms different from that described here. A person skilled in the art can make similar improvements without departing from the connotation of the present disclosure. Therefore, the present disclosure is not limited by the specific embodiments disclosed below.

In the description of the present disclosure, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present disclosure can be understood based on specific circumstances.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Figure 2:
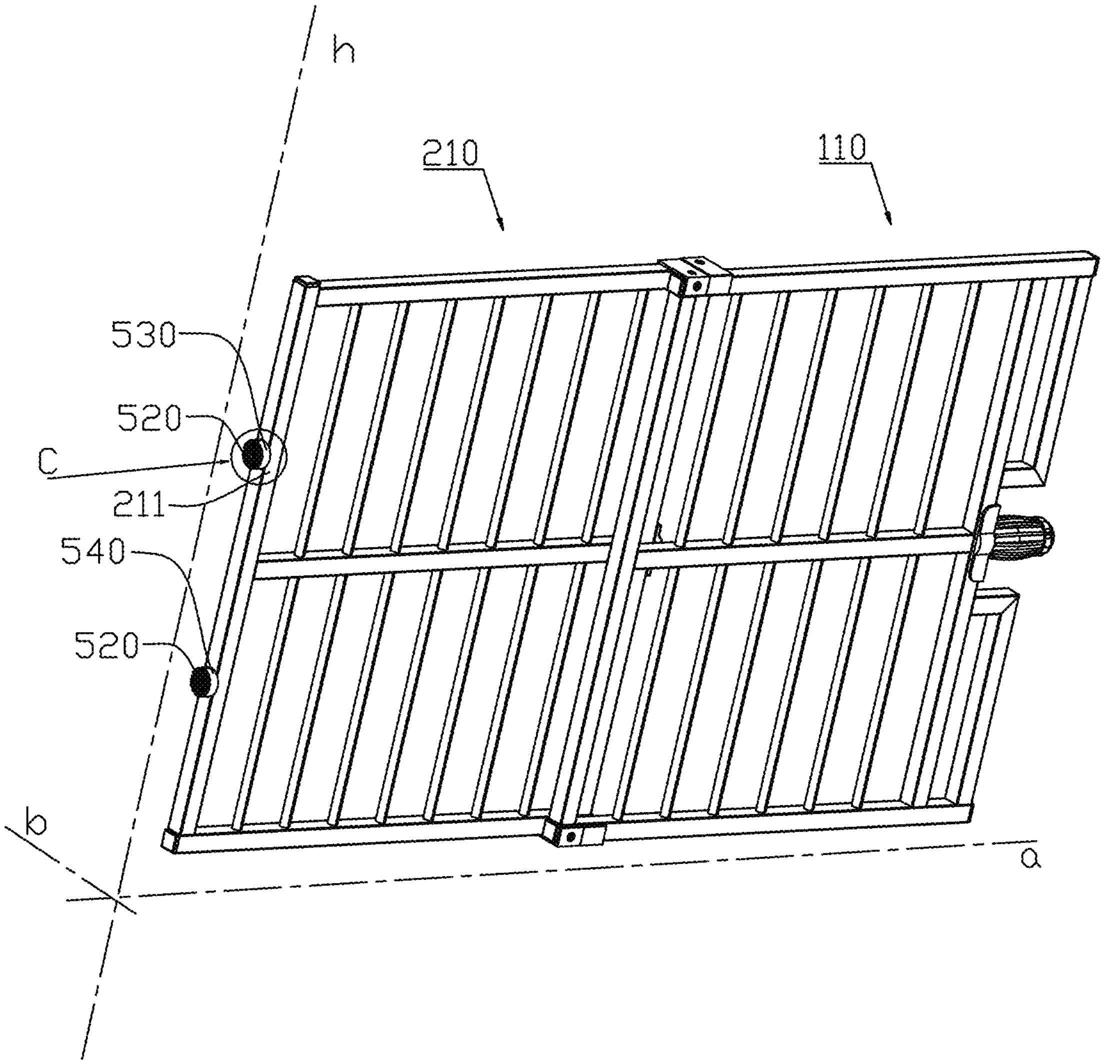
FIG. 2 is a second-angle overall view of the slidably extendable barrier according to the present disclosure.
Figure 3:
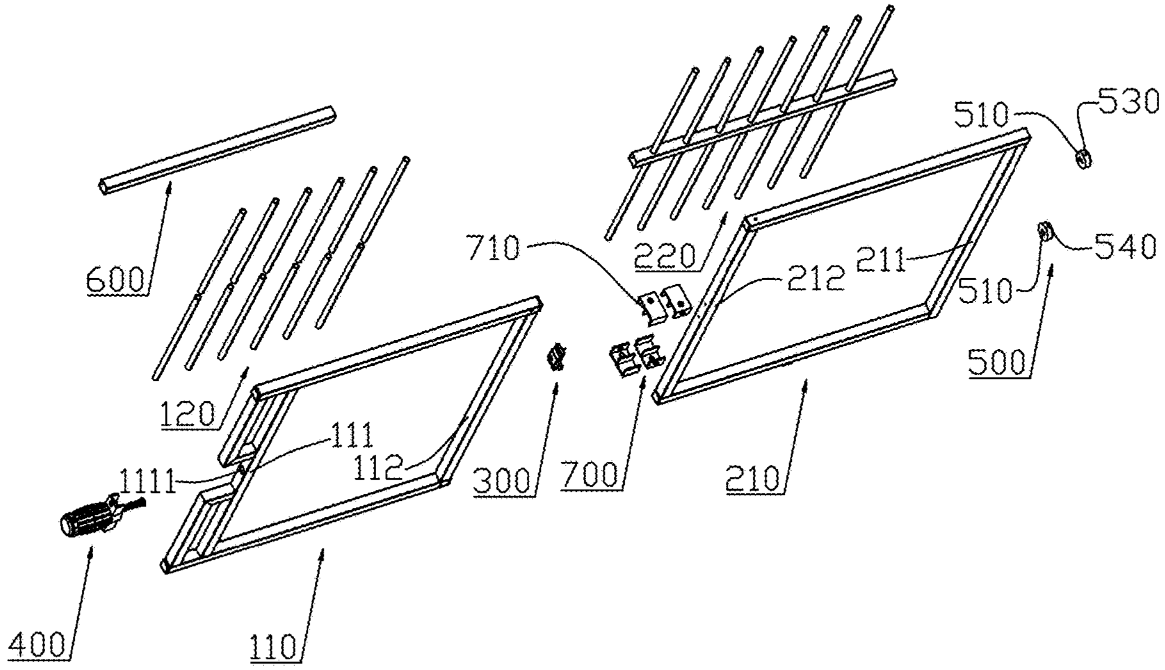
FIG. 3 is a first-angle exploded view of the slidably extendable barrier according to the present disclosure.
Figure 4:
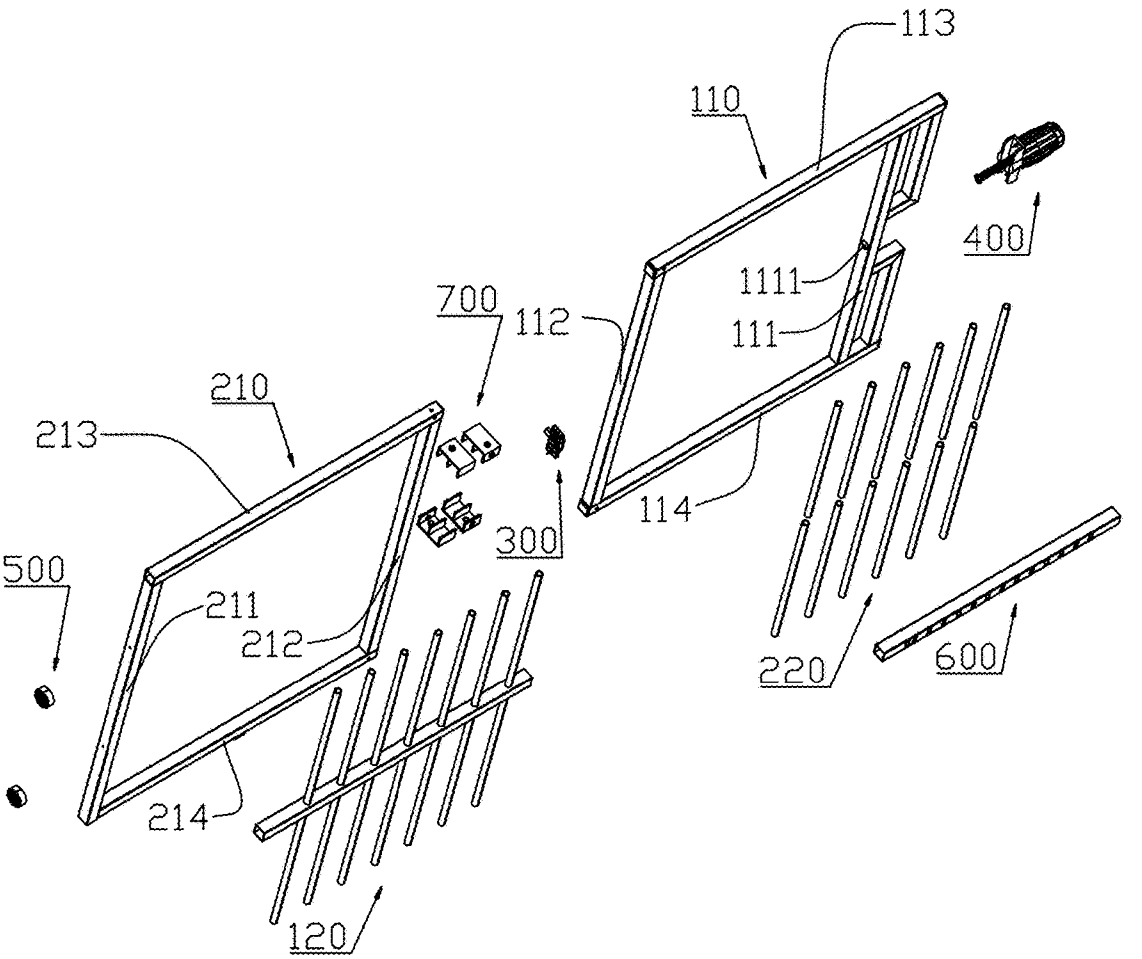
FIG. 4 is a second-angle exploded view of the slidably extendable barrier according to the present disclosure.
Figure 5:
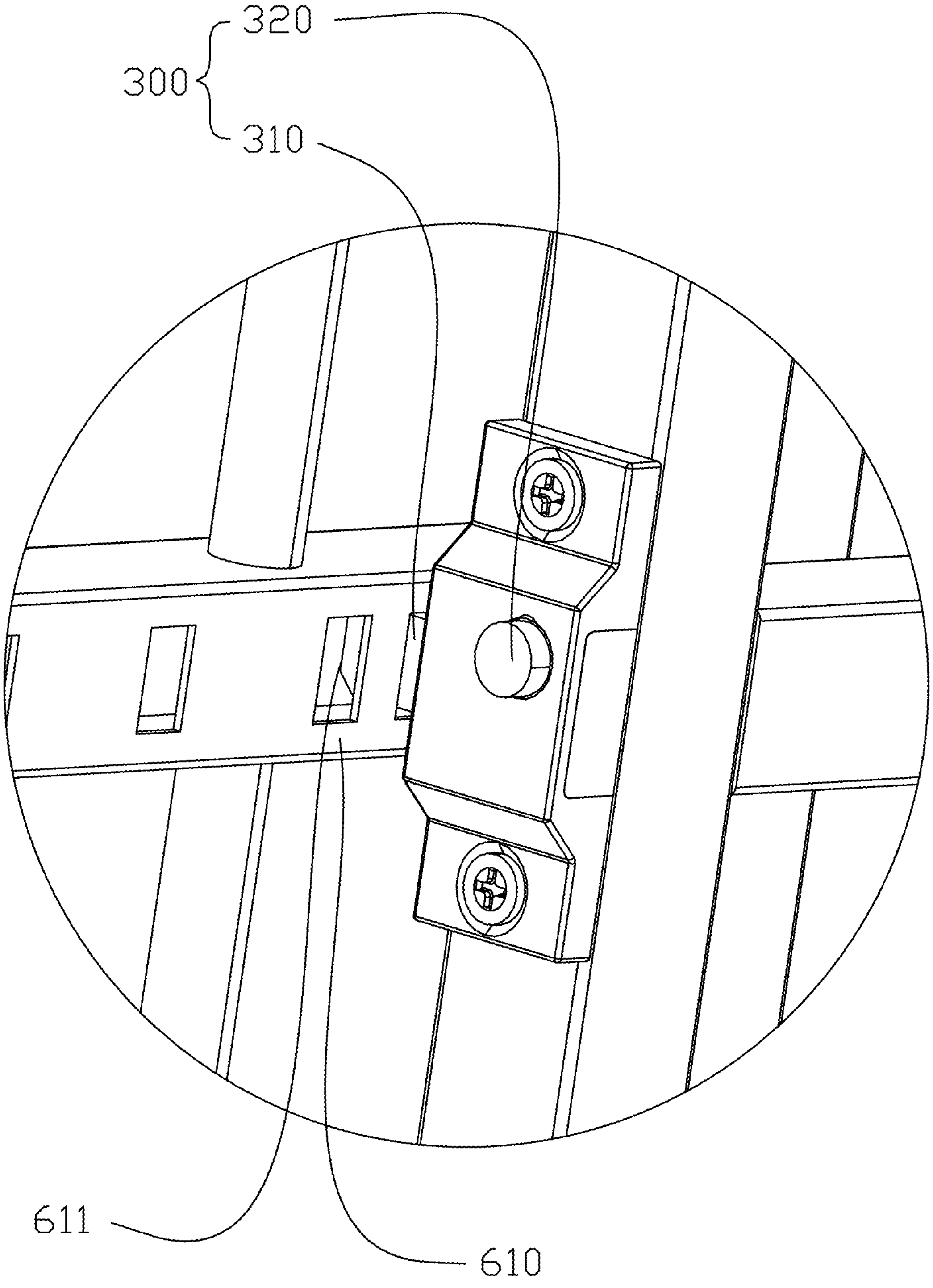
FIG. 5 is an enlarged view of an area circled as A in FIG. 1.
Figure 6:
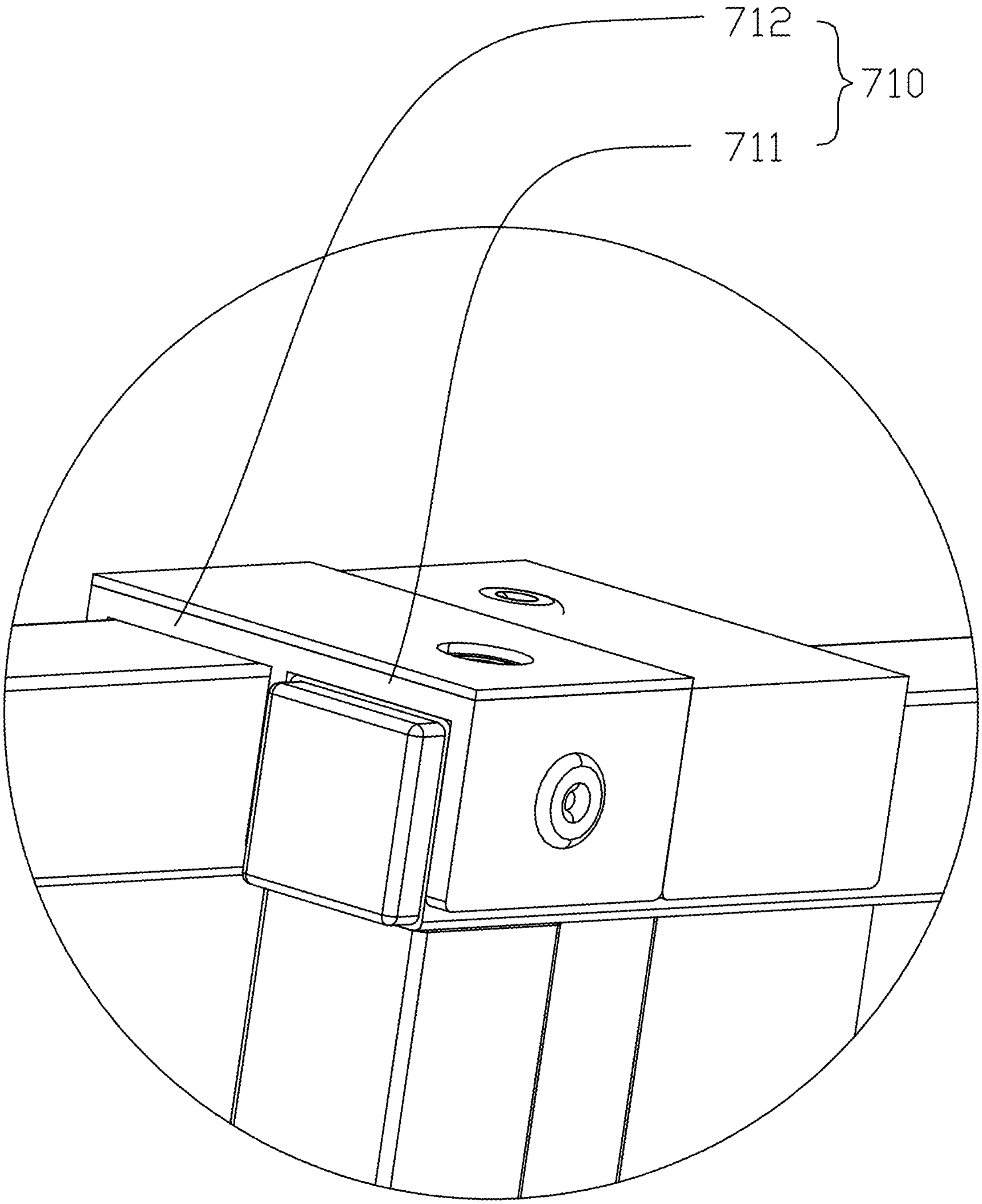
FIG. 6 is an enlarged view of an area circled as B in FIG. 1.
Figure 7:
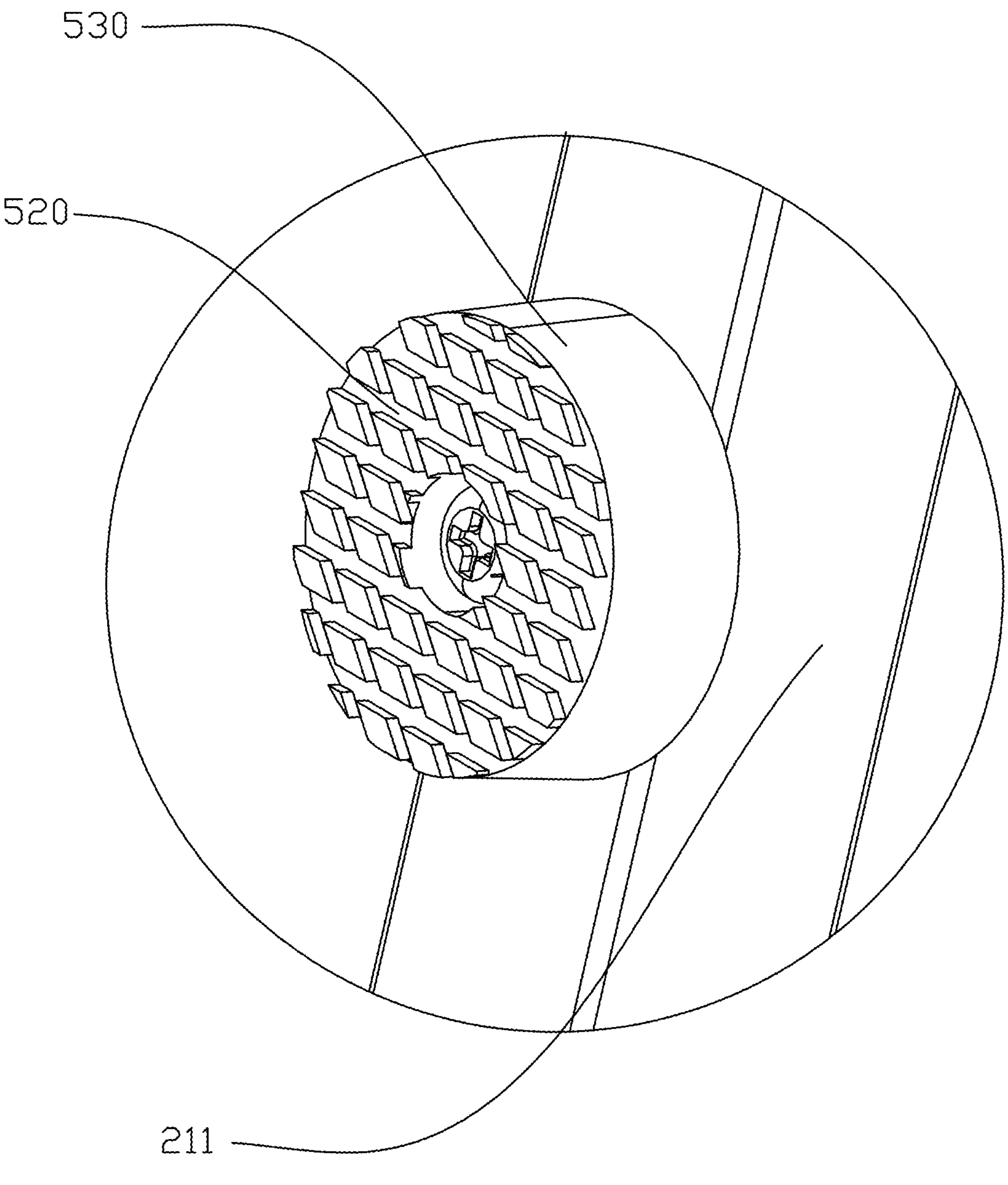
FIG. 7 is an enlarged view of an area circled as C in FIG. 2.
Figure 8:
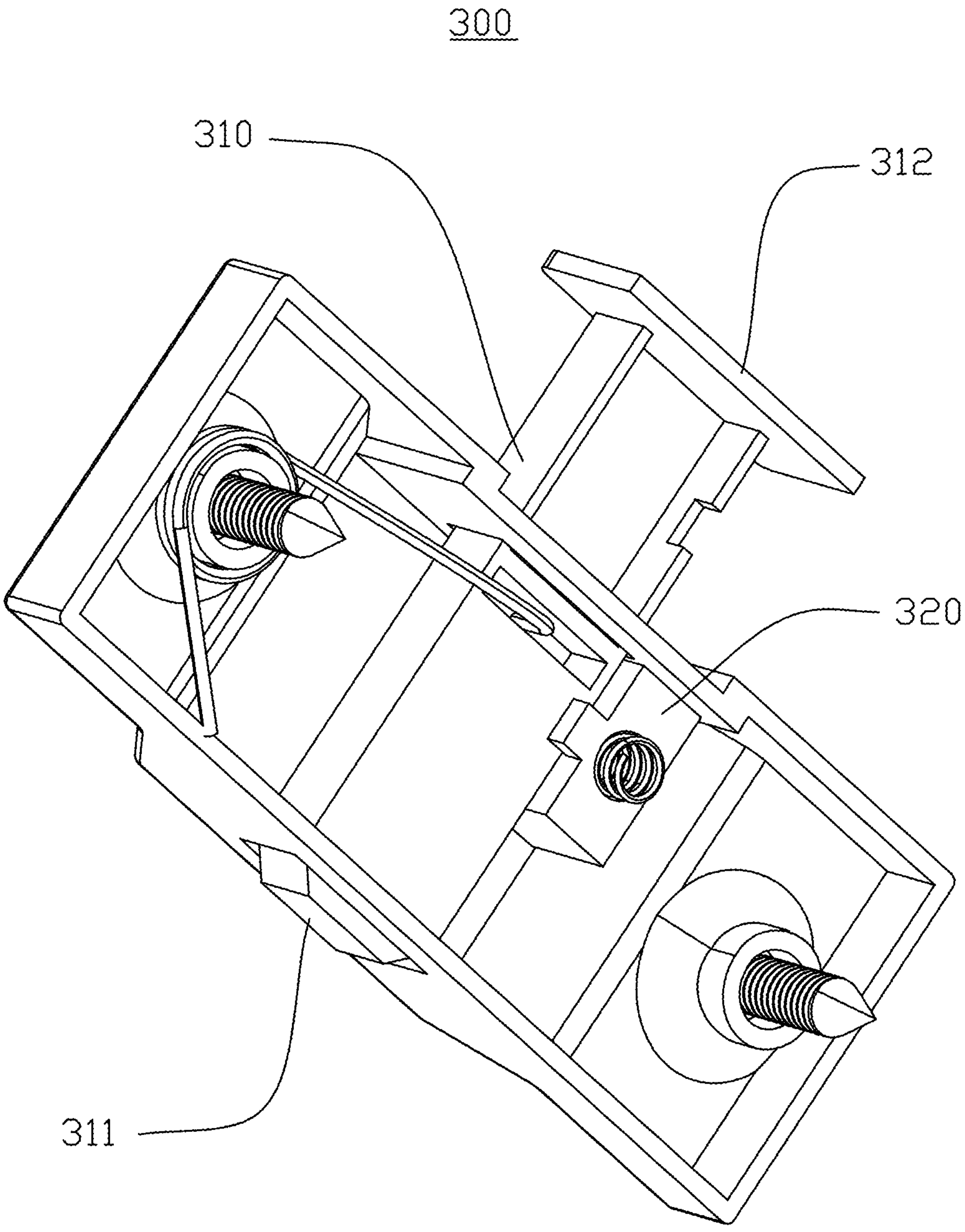
FIG. 8 is a schematic view of the locking assembly 300 of the slidably extendable barrier according to the present disclosure in a locked state.
Figure 9:
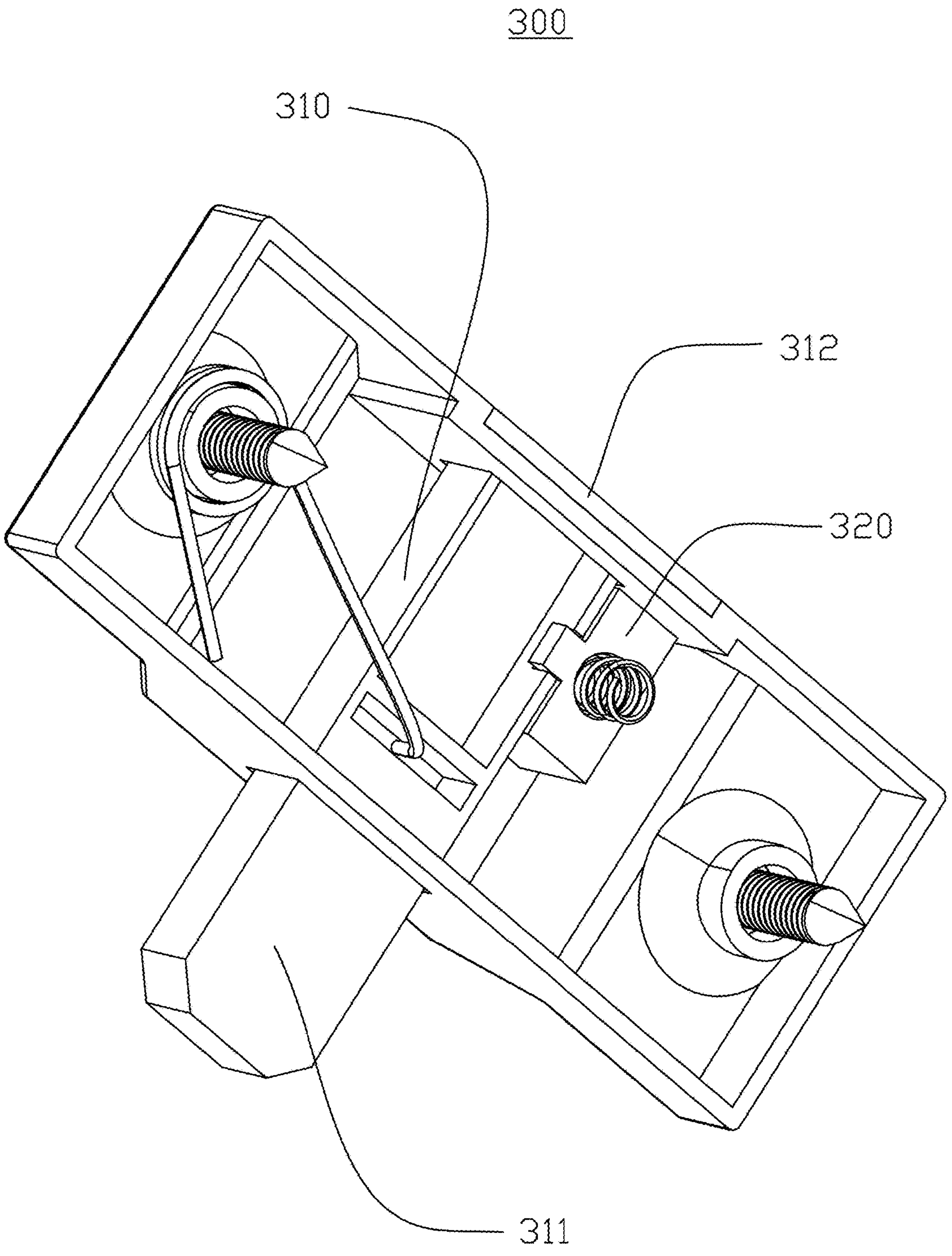
FIG. 9 is a schematic view of the locking assembly 300 of the slidably extendable barrier according to the present disclosure in an unlocked state.
Figure 10:
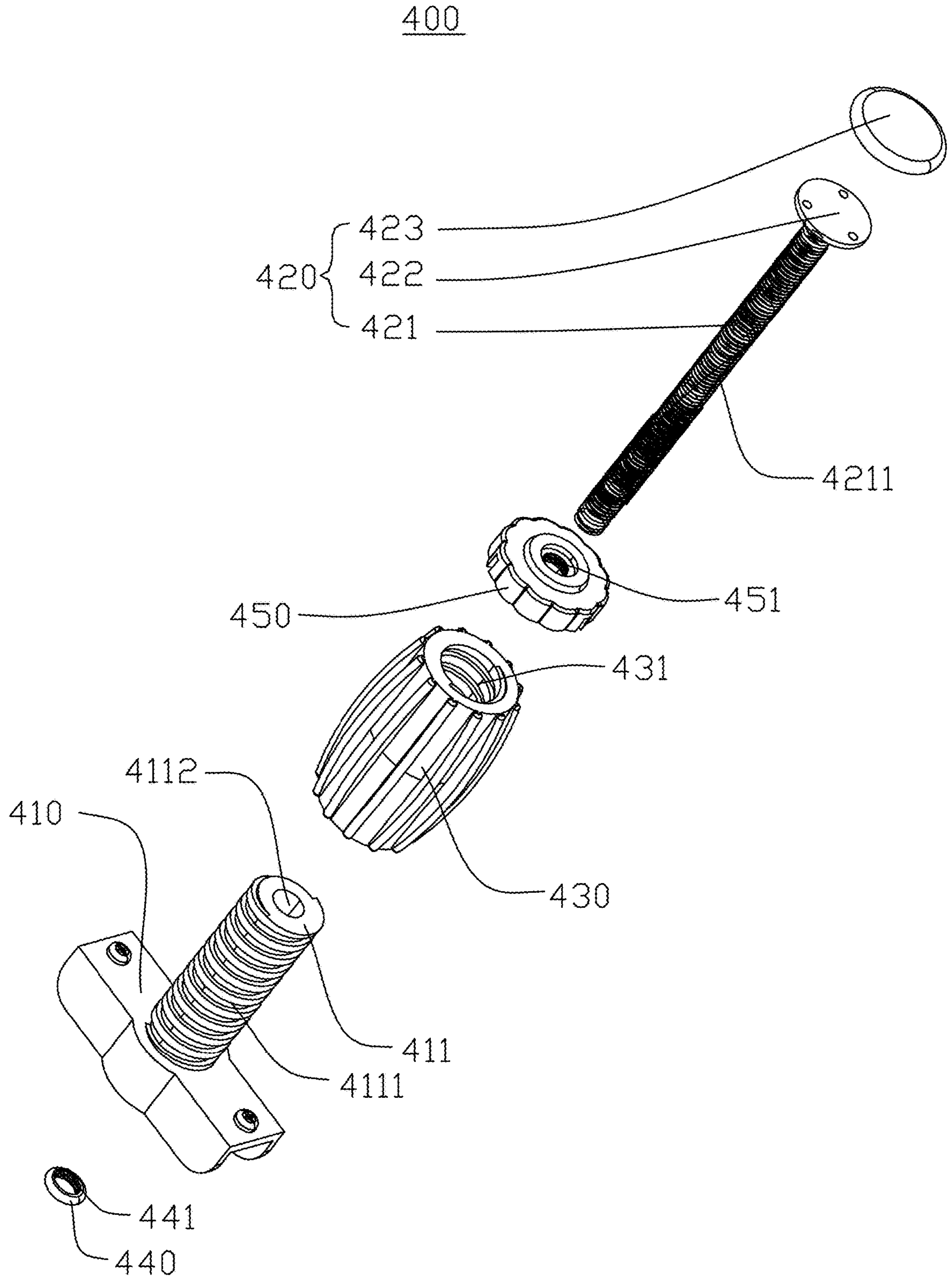
FIG. 10 is an exploded view of the pressure adjustment assembly 400 of the slidably extendable barrier according to the present disclosure.

Referring to FIGS. 1 to 10, a slidably extendable barrier configured to be disposed between two opposing positions includes:

- a first sliding panel 100 including a first frame 110, wherein the first sliding panel 100 extends along a length direction and a height direction;
- a second sliding panel 200 including a second frame 210, wherein the second sliding panel 200 extends along the length direction and the height direction, and the first sliding panel 100 and the second sliding panel 200 are slidable relative to each other along the length direction;
- a locking assembly 300 configured to selectively lock the first sliding panel 100 and the second sliding panel 200 in the length direction; and
- a pressure adjustment assembly 400. When the locking assembly 300 locks the first sliding panel 100 and the second sliding panel 200 in the length direction, the pressure adjustment assembly 400 applies pressure to the first sliding panel 100 and the second sliding panel 200, thereby gradually applying pressure on the two opposing positions, whereby the slidably extendable barrier is fixed between the two opposing positions.

With the above configuration, during operation, the first sliding panel 100 serves as the basic structural unit of the barrier, extending along the length direction and the height direction to form the main framework, providing physical support and initial blocking function. The second sliding panel 200 cooperates with the first sliding panel 100, adjusting the total length of the barrier through relative sliding, thereby covering gaps of varying widths and enhancing the barrier's adaptability to different spaces. The locking assembly 300 fixes the relative positions of the first sliding panel 100 and the second sliding panel 200 when they reach a target length to prevent unintended sliding due to external forces (e.g., impact, wind pressure, etc.), ensuring the barrier's positional stability. The locking assembly 300 acts as a critical switching mechanism between "sliding adjustment" and "fixed pressure-bearing." The pressure adjustment assembly 400 can only effectively apply pressure to the barrier when the locking assembly is in the locked state, securing it between the two opposing positions. Through the coordinated operation of these structures, the slidably extendable barrier achieves a complete functional sequence of "flexible adjustment—reliable locking—stable fixation," thereby enhancing the user's experience. In the present application, the length direction corresponds to the direction indicated by axis a, the width direction to axis b, and the height direction to axis h.

In this embodiment, the slidably extendable barrier further includes a fixed pressure end unit 500. The first frame 110 includes a first outer end member 111 and a first inner end member 112; the second frame 210 includes a second outer end member 211 and a second inner end member 212; the pressure adjustment assembly 400 includes a mounting base 410 and a sliding pressure end unit 420; the mounting base 410 is fixedly connected to the first outer end member 111; the fixed pressure end unit 500 is fixedly connected to the second outer end member 211. When the locking assembly 300 locks the first sliding panel 100 and the second sliding panel 200 at a desired position along the length direction, the pressure adjustment assembly 400 applies pressure to the first sliding panel 100 and the second sliding panel 200, thereby enabling the sliding pressure end unit 420 and the fixed pressure end unit 500 to gradually apply pressure to the two opposing positions, whereby the slidably extendable barrier is fixed between the two opposing positions. With the above configuration, during operation, the first sliding panel 100 and the second sliding panel 200 adjust the barrier length by relative sliding to accommodate different spacing requirements, while the first frame 110 and the second frame 210 provide support and stability. The locking assembly 300 fixes the panels' positions to prevent sliding during operation. The pressure adjustment assembly 400 includes the mounting base 410 fixed to the first outer end member 111 for force transmission, and the sliding pressure end unit 420 for dynamic pressure application. The fixed pressure end unit 500 connects to the second outer end member 211 to transmit stationary-side pressure. These components collectively achieve 'sliding adjustment—dimensional locking—dual-end pressure fixation,' offering flexibility, stability, and convenience, making it suitable for residential protection scenarios.

In this embodiment, the fixed pressure end unit 500 includes a mounting surface 510 in face-contact with the second outer end member 211, and an abutment surface 520 configured to abut against one of the two opposing positions. With the above configuration, during operation, the mounting surface 510 and the second outer end member 211 uniformly distribute structural force through face-contact, effectively preventing stress concentration while ensuring mounting positioning accuracy and structural compatibility, thereby enhancing connection strength. The abutment surface 520, abutting against one of the two opposing positions, enables uniform pressure distribution and increases contact area, thereby enhancing frictional force.

In this embodiment, the pressure adjustment assembly 400 further includes an adjustment handle 430; the mounting base 410 includes an adjustment screw 411; the adjustment handle 430 is provided with a first internal thread 431; the adjustment screw 411 is provided with a first external thread 4111 matching the first internal thread 431; and the adjustment handle 430 and the adjustment screw 411 are threadedly engaged. With the above configuration, during operation, the first internal thread 431 of the adjustment handle 430 threadedly engages with the first external thread 4111 of the adjustment screw 411 to form a screw transmission mechanism. The adjustment handle 430 acts as a manual drive interface. It converts rotational input into axial displacement of the adjustment screw 411 via threaded engagement. The self-locking characteristic of the threaded engagement preventing post-pressure loosening while the predetermined pitch provides controlled adjustment accuracy. This threaded connection offers strong self-locking capability, stepless adjustability, and maintenance convenience suitable for both residential and industrial applications, achieving superior operational convenience and reliability compared to hydraulic or spring-based adjustment alternatives.

In this embodiment, the adjustment screw 411 includes an adjustment through-hole 4112; the sliding pressure end unit 420 includes a screw portion 421 and an abutment end portion 422; the screw portion 421 is provided with a second external thread 4211, and a maximum outer diameter of the screw portion 421 is smaller than an inner diameter of the adjustment through-hole 4112, such that the screw portion 421 is configured to slide within the adjustment through-hole 4112. With the above configuration, during operation, the adjustment through-hole 4112 provides axial sliding clearance for the screw portion 421; moreover, its inner diameter is larger than the maximum outer diameter of the screw portion 421. The bore wall of the adjustment through-hole 4112 effectively constrains the screw portion 421 to ensure stable axial movement along the central axis, thereby enabling precise thrust transmission. The adjustment through-hole 4112 further provides radial positioning function to prevent deviation of the screw portion 421, achieving efficient and stable pressure transmission through this simple yet effective structural arrangement.

In this embodiment, the pressure adjustment assembly 400 further includes a stop nut 440, and a maximum outer diameter of the stop nut 440 is larger than the inner diameter of the adjustment through-hole 4112; the stop nut 440 is provided with a second internal thread 441 matching the second external thread 4211; the screw portion 421 of the sliding pressure end unit 420 is configured to pass through the adjustment through-hole 4112 and then threadedly engage with the stop nut 440, thereby ensuring that the screw portion is partially retained within the adjustment through-hole 4112 during sliding movement of the sliding pressure end unit 420. With the above configuration, during operation, the stop nut 440 having an outer diameter larger than the inner diameter of the adjustment through-hole 4112 mechanically prevents complete disengagement of the sliding pressure end unit 420 from the adjustment through-hole 4112, thereby ensuring structural safety. The second internal thread 441 of the stop nut 440 engages with the second external thread 4211 of the screw portion 421 to form a stable constrained connection. The screw portion 421 retains partial engagement within the adjustment through-hole 4112 during sliding of the screw portion 421, effectively preventing detachment from the adjustment through-hole 4112.

In this embodiment, the pressure adjustment assembly 400 further includes an auxiliary adjustment nut 450; the auxiliary adjustment nut 450 is provided with a third internal thread 451 matching the second external thread 4211; the screw portion 421 of the sliding pressure end unit 420 is configured to pass through the auxiliary adjustment nut 450 and the adjustment through-hole 4112 in sequence, and finally threadedly engage with the stop nut 440. With the above configuration, during operation, the third internal thread 451 of the auxiliary adjustment nut 450 engages with the second external thread 4211 to form an additional guiding pivot point. Together with the adjustment through-hole 4112, this combination constrains radial displacement of the screw portion 421, reduces wobbling during sliding motion, and thereby improves linearity of the pressure application path. The stop nut 440, having an outer diameter exceeding the inner diameter of the adjustment through-hole 4112, physically prevents complete disengagement of the screw portion 421, while the auxiliary adjustment nut 450 further limits maximum displacement of the screw portion 421 through its threaded engagement.

In this embodiment, the first outer end member 111 is provided with an accommodation through-hole 1111; a position of the accommodation through-hole 1111 corresponds to a position of the adjustment through-hole 4112; and an inner diameter of the accommodation through-hole 1111 is larger than the maximum outer diameter of the stop nut 440, such that an end of the screw portion 421 connected to the stop nut 440 is slidable within the accommodation through-hole 1111. With the above configuration, during operation, the accommodation through-hole 1111 cooperates with the adjustment through-hole 4112 to form a dual guidance and restraint structure for the sliding pressure end unit 420. The accommodation through-hole 1111 has an inner diameter larger than the outer diameter of the stop nut 440, allowing free sliding movement of the end of the screw portion 421 within the accommodation through-hole. This configuration ensures smooth linear motion of the sliding pressure end unit 420 during pressure application, thereby preventing jamming or stress concentration caused by radial displacement. Simultaneously, the accommodation through-hole 1111 provides operational clearance for the stop nut 440, preventing interference with the first outer end member 111 and thereby ensuring efficient operation of the entire pressurization system with improved barrier fixation reliability and stability.

In this embodiment, the slidably extendable barrier further includes an elongated member 600 fixedly connected to either the first frame 110 or the second frame 210. The elongated member 600 includes a plurality of spaced-apart preset positions 610; and the locking assembly 300 is selectively engageable with any one of the preset positions 610 to lock the first sliding panel 100 and the second sliding panel 200. With the above configuration, during operation, the elongated member 600, when fixed to either the first frame 110 or the second frame 210, forms discrete adjustment nodes at the preset positions 610 that provide clearly identifiable locking length references for the barrier. This configuration enables users to rapidly position the barrier at desired locations based on actual spacing requirements. Constructed from high-strength materials (such as steel or aluminum alloy), the elongated member 600 significantly enhances the overall structural rigidity of the barrier and minimizes lateral deformation during axial sliding through its rigid connection to the frames.

In this embodiment, the locking assembly 300 includes a locking rod 310; the locking rod 310 includes a locking end 311 and a control end 312; each preset position 610 is provided with a locking hole 611. When the locking end 311 aligns with the locking hole 611, pressing the control end 312 to lock the first sliding panel 100 and the second sliding panel 200, thereby preventing relative sliding movement between the first sliding panel 100 and the second sliding panel 200 along the length direction. With the above configuration, during operation, the locking rod 310 cooperates with the locking hole 611 to lock the first sliding panel 100 and the second sliding panel 200. The locking rod 310 includes the locking end 311 and the control end 312, where the locking end 311 is form-fitted to the locking hole 611, and the control end 312 is configured for pressing operation. When the first sliding panel 100 and the second sliding panel 200 slide to a target position, the locking end 311 aligns with the locking hole 611, and upon pressing the control end 312, the locking end 311 inserts into the locking hole 611 to lock the first sliding panel 100 and the second sliding panel 200. The locking rod 310 is automatically returned by a biasing force of an elastic member.

In this embodiment, the locking assembly 300 further includes a control button 320, and the control button 320 is configured to disengage the first sliding panel 100 and the second sliding panel 200 from a locked state, thereby enabling relative sliding movement between the first sliding panel and the second sliding panel along the length direction. With the above configuration, during operation, the incorporation of the control button 320 optimizes the operational process and user experience of the locking assembly 300. A simple press on the control button 320 actuates the locking rod 310 to disengage the locking end 311 from the locking hole 611, thereby promptly disengaging the locked state between the first sliding panel 100 and the second sliding panel 200 and enabling free sliding of the panels. The control button 320 is automatically returned by a biasing force of an elastic member.

In this embodiment, the width direction is defined between the first frame 110 and the second frame 210; the first frame 110 and the second frame 210 are meshed with each other along the width direction while remaining spaced-apart; the first frame 110 and the second frame 210 remain parallel to each other and slide parallelly along the length direction. With the above configuration, during operation, the first frame 110 and the second frame 210 are meshed with each other along the width direction while remaining spaced-apart, and slide parallelly along the length direction, thereby providing the slidably extendable barrier with stable adjustability and precise guidance.

In this embodiment, the slidably extendable barrier further includes a sliding guide assembly 700 fixedly mounted to the first frame 110 and the second frame 210, thereby maintaining stability of the first frame 110 and the second frame 210 during sliding movement. The sliding guide assembly 700 includes a plurality of guide elements 710; each guide element 710 includes a fixed mounting portion 711 and a sliding mounting portion 712; the first frame 110 includes a first upper member 113 and a first lower member 114; the second frame 210 includes a second upper member 213 and a second lower member 214; the fixed mounting portions 711 of the plurality of guide elements 710 are fixedly connected to the first upper member 113, the first lower member 114, the second upper member 213, and the second lower member 214, respectively; and the sliding mounting portions 712 of the plurality of guide elements 710 are slidably connected to the first upper member 113, the first lower member 114, the second upper member 213, and the second lower member 214, respectively. With the above configuration, during operation, the sliding guide assembly 700, through an arrangement of the plurality of guide elements 710, provides stable support for sliding movement between the first frame 110 and the second frame 210. The fixed mounting portion 711 of each guide element 710 is fixedly connected to the respective frame members serving as mechanical anchor points, while the sliding mounting portion 712 slidably contacts the frame members, thereby endowing the slidably extendable barrier with both stable adjustability and precise guidance capability to prevent lateral deviation during sliding. The distributed installation of multiple guide elements 710 enables load dispersion and wear reduction, and the structural design further supporting modular assembly or disassembly.

In this embodiment, the first upper member 113, the first lower member 114, the second upper member 213 and the second lower member 214 are each simultaneously and fixedly connected to at least one of the fixed mounting portions 711 and slidably connected to at least one of the sliding mounting portions 712. With the above configuration, during operation, the first upper member 113, the first lower member 114, the second upper member 213, and the second lower member 214 collectively form a fixed-sliding hybrid connection pattern with the plurality of guide elements 710 of the sliding guide assembly 700, thereby significantly enhancing both sliding stability and structural strength of the barrier. The fixed mounting portion 711 of each guide element 710 establishes rigid connections with respective frame members, ensuring the guide elements 710 maintain positional integrity during frame sliding to provide a stable guidance reference, while the sliding mounting portion 712 forms movable connections permitting relative sliding along the length direction while constraining radial degrees of freedom (width/height directions) through contact interfaces. Each of the first upper member 113, the first lower member 114, the second upper member 213, and the second lower member 214 is connected to at least one fixed mounting portion 711 serving as a positional anchor point and at least one sliding mounting portion 712 acting as a kinematic pivot, collectively constituting a two-point linear guidance constraint that prevents torsional deformation or deviation during sliding.

In this embodiment, the abutment surface 520 is provided with an anti-slip structure. With the above configuration, during operation, the anti-slip structure disposed on the abutment surface 520 enhances frictional characteristics at the contact interface, thereby improving mounting reliability of the barrier and preventing functional failure caused by sliding.

In this embodiment, the fixed pressure end unit 500 includes a first pressure end component 530 and a second pressure end component 540 distributed along a height direction of the second outer end member 211. With the above configuration, during operation, the fixed pressure end unit 500 employs the first pressure end component 530 and the second pressure end component 540 distributed along the height direction of the second outer end member 211 to achieve multi-point vertical pressure application, thereby improving both contact uniformity and mounting reliability between the barrier and a target interface. In this embodiment, the first pressure end component 530 and the second pressure end component 540 are vertically distributed on upper and lower sides of the sliding pressure end unit 420 respectively.

In this embodiment, the abutment end portion is sleeved with a soft rubber layer. With the above configuration, during operation, the soft rubber layer 423 sleeved over the abutment end portion 422 enhances frictional characteristics due to its higher coefficient of friction, thereby improving mounting reliability of the barrier and preventing functional failure caused by sliding.

In this embodiment, the first sliding panel 100 further includes a first barrier component 120 fixedly connected to an interior of the first frame 110; the second sliding panel 200 further includes a second barrier component 220 fixedly connected to an interior of the second frame 210; the first barrier component 120 is configured to reduce a blocking gap in the first sliding panel 100; and the second barrier component 220 is configured to reduce a blocking gap in the second sliding panel 200. With the above configuration, during operation, the required blocking gaps vary for different barrier applications. To accommodate diverse user requirements, the first barrier component 120 and the second barrier component 220 with different gap dimensions may be selectively fixed within the first frame 110 and the second frame 210 respectively, thereby enabling the barrier to meet different needs. For example, when the barrier is used to prevent small pets from escaping, the first barrier component 120 and the second barrier component 220 need only have gap dimensions smaller than the pets' body size.

In this embodiment, the first barrier component 120 includes rod-shaped elements or mesh-shaped elements uniformly arranged within the first frame 110; and the second barrier component 220 includes rod-shaped elements or mesh-shaped elements uniformly arranged within the second frame 120. The uniformly arranged rod-shaped elements refer to elements disposed parallel or crosswise along the length or height direction of the first frame 110 and the second frame 210, forming linear barrier structures configured to block object passage as exemplarily shown in the accompanying drawings. The mesh-shaped elements refer to continuous planar structures formed by interwoven warp and weft wires (e.g., metal wires or polymeric fibers), the planar structures are intimately conformed to and fixedly attached to the inner walls of the frames to ensure structural integrity, with exemplary implementations including wire meshes and plastic grids.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

The invention claimed is:

1. A slidably extendable barrier configured to be disposed between two opposing positions, comprising:

a first sliding panel comprising a first frame, wherein the first sliding panel extends along a length direction and a height direction;

a second sliding panel comprising a second frame, wherein the second sliding panel extends along the length direction and the height direction, and the first sliding panel and the second sliding panel are slidable relative to each other along the length direction;

a locking assembly configured to selectively lock the first sliding panel and the second sliding panel in the length direction; and a pressure adjustment assembly, wherein when the locking assembly locks the first sliding panel and the second sliding panel in the length direction, the pressure adjustment assembly applies pressure to the first sliding panel and the second sliding panel, thereby gradually applying pressure on the two opposing positions, whereby the slidably extendable barrier is fixed between the two opposing positions; the pressure adjustment assembly comprises a mounting base and a sliding pressure end unit; the mounting base comprises an adjustment screw; the adjustment screw comprises an adjustment through-hole; the sliding pressure end unit comprises a screw portion and an abutment end portion; the screw portion is provided with a second external thread, and a maximum outer diameter of the screw portion is smaller than an inner diameter of the adjustment through-hole, whereby the screw portion is slidable within the adjustment through-hole;

a sliding guide assembly fixedly mounted to the first frame and the second frame to maintain stability of the first frame and the second frame during sliding movement;

the sliding guide assembly comprises a plurality of guide elements; each guide element comprises a fixed mounting portion and a sliding mounting portion; the first frame comprises a first upper member and a first lower member; the second frame comprises a second upper member and a second lower member;

the first upper member, the first lower member, the second upper member and the second lower member are each simultaneously and fixedly connected to at least one of the fixed mounting portions and slidably connected to at least one of the sliding mounting portions.

2. The slidably extendable barrier according to claim 1, further comprising a fixed pressure end unit, wherein the first frame comprises a first outer end member and a first inner end member; the second frame comprises a second outer end member and a second inner end member; the pressure adjustment assembly comprises a mounting base and a sliding pressure end unit; the mounting base is fixedly connected to the first outer end member; the fixed pressure end unit is fixedly connected to the second outer end member; and when the locking assembly locks the first sliding panel and the second sliding panel at a desired position along the length direction, the pressure adjustment assembly applies pressure to the first sliding panel and the second sliding panel, thereby enabling the sliding pressure end unit and the fixed pressure end unit to gradually apply pressure to the two opposing positions, whereby the slidably extendable barrier is fixed between the two opposing positions.

3. The slidably extendable barrier according to claim 2, wherein the fixed pressure end unit comprises a mounting surface in face-contact with the second outer end member, and an abutment surface configured to abut against one of the two opposing positions.

4. The slidably extendable barrier according to claim 3, wherein the pressure adjustment assembly further comprises an adjustment handle; the mounting base comprises an adjustment screw; the adjustment handle is provided with a first internal thread; the adjustment screw is provided with a first external thread matching the first internal thread; and the adjustment handle and the adjustment screw are threadedly engaged.

5. The slidably extendable barrier according to claim 3, wherein the abutment surface is provided with an anti-slip structure.

6. The slidably extendable barrier according to claim 3, wherein the fixed pressure end unit comprises a first pressure end component and a second pressure end component distributed along a height direction of the second outer end member.

7. The slidably extendable barrier according to claim 1, wherein the pressure adjustment assembly further comprises a stop nut, and a maximum outer diameter of the stop nut is larger than the inner diameter of the adjustment through-hole; the stop nut is provided with a second internal thread matching the second external thread; the screw portion of the sliding pressure end unit is configured to pass through the adjustment through-hole and then threadedly engage with the stop nut, whereby the screw portion is partially retained within the adjustment through-hole during sliding movement of the sliding pressure end unit.

8. The slidably extendable barrier according to claim 7, wherein the pressure adjustment assembly further comprises an auxiliary adjustment nut; the auxiliary adjustment nut is provided with a third internal thread matching the second external thread; the screw portion of the sliding pressure end unit is configured to pass through the auxiliary adjustment nut and the adjustment through-hole in sequence, and finally threadedly engage with the stop nut.

9. The slidably extendable barrier according to claim 7, wherein the first outer end member is provided with an accommodation through-hole; a position of the accommodation through-hole corresponds to a position of the adjustment through-hole; and an inner diameter of the accommodation through-hole is larger than the maximum outer diameter of the stop nut, whereby an end of the screw portion connected to the stop nut is slidable within the accommodation through-hole.

10. The slidably extendable barrier according to claim 1, further comprising an elongated member fixedly connected to either the first frame or the second frame, wherein the elongated member comprises a plurality of spaced-apart preset positions; and the locking assembly is selectively engageable with any one of the preset positions to lock the first sliding panel and the second sliding panel.

11. The slidably extendable barrier according to claim 10, wherein the locking assembly comprises a locking rod; the locking rod comprises a locking end and a control end; each preset position is provided with a locking hole; and when the locking end is aligned with the locking hole, pressing the control end to lock the first sliding panel and the second sliding panel, whereby relative sliding movement between the first sliding panel and the second sliding panel along the length direction is prevented.

12. The slidably extendable barrier according to claim 10, wherein the locking assembly further comprises a control button, and the control button is configured to disengage the first sliding panel and the second sliding panel from a locked state, whereby relative sliding movement between the first sliding panel and the second sliding panel along the length direction is enabled.

13. The slidably extendable barrier according to claim 1, wherein a width direction is defined between the first frame and the second frame; the first frame and the second frame are meshed with each other along the width direction while remaining spaced-apart; the first frame and the second frame remain parallel to each other and slide parallelly along the length direction.

14. The slidably extendable barrier according to claim 1, wherein the abutment end portion is sleeved with a soft rubber layer.

15. The slidably extendable barrier according to claim 1, wherein the first sliding panel further comprises a first barrier component fixedly connected to an interior of the first frame; the second sliding panel further comprises a second barrier component fixedly connected to an interior of the second frame; the first barrier component is configured to reduce a blocking gap in the first sliding panel; and the second barrier component is configured to reduce a blocking gap in the second sliding panel.

16. The slidably extendable barrier according to claim 15, wherein the first barrier component comprises rod-shaped elements or mesh-shaped elements uniformly arranged within the first frame; and the second barrier component comprises rod-shaped elements or mesh-shaped elements uniformly arranged within the second frame.

* * * * *